(12) United States Patent
Choi et al.

(10) Patent No.: US 11,476,632 B2
(45) Date of Patent: Oct. 18, 2022

(54) LASER APPARATUS FOR PRINTED ELECTRONICS SYSTEM AND OPERATING METHOD THEREOF

(71) Applicant: PROTEC CO., LTD., Anyang-si (KR)

(72) Inventors: Eui Keun Choi, Asan-si (KR); Dae Yong Lee, Pyeongtaek-si (KR); Da Hai Zhang, Anyang-si (KR); Seung Hwan Choi, Anyang-si (KR); Seung Min Hong, Anyang-si (KR)

(73) Assignee: PROTEC CO., LTD., Anyang-si (KR)

( * ) Notice: Subject to any disclaimer, the term of this patent is extended or adjusted under 35 U.S.C. 154(b) by 335 days.

(21) Appl. No.: 16/649,425

(22) PCT Filed: Sep. 21, 2018

(86) PCT No.: PCT/KR2018/011301
§ 371 (c)(1),
(2) Date: Mar. 20, 2020

(87) PCT Pub. No.: WO2019/103299
PCT Pub. Date: May 31, 2019

(65) Prior Publication Data
US 2020/0303892 A1 Sep. 24, 2020

(30) Foreign Application Priority Data

Nov. 23, 2017 (KR) .................. 10-2017-0157239
Dec. 26, 2017 (KR) .................. 10-2017-0179114

(51) Int. Cl.
*H01S 3/00* (2006.01)
*B41J 2/44* (2006.01)
(Continued)

(52) U.S. Cl.
CPC .................. *H01S 3/13* (2013.01); *B22F 7/06* (2013.01); *B41J 2/442* (2013.01); *H01S 3/0071* (2013.01)

(58) Field of Classification Search
CPC .. H01S 3/13; H01S 3/0071; B22F 7/06; B22F 1/107; B22F 7/08; B22F 3/105; B41J 2/442; G02F 1/13
See application file for complete search history.

(56) References Cited

U.S. PATENT DOCUMENTS

| | | | | |
|---|---|---|---|---|
| 7,729,397 B1* | 6/2010 | Collier | .................. | H01S 5/0683 372/21 |
| 2007/0177637 A1* | 8/2007 | Koyama | .................. | G02F 1/216 372/29.013 |
| 2015/0085197 A1* | 3/2015 | Yoshida | ............... | H04N 5/7475 348/748 |

FOREIGN PATENT DOCUMENTS

| | | |
|---|---|---|
| CN | 102441740 A | 5/2012 |
| CN | 104698768 A | 6/2015 |

(Continued)

*Primary Examiner* — Xinning(Tom) Niu
(74) *Attorney, Agent, or Firm* — Novick, Kim & Lee, PLLC; Jae Youn Kim

(57) ABSTRACT

There is provided a laser apparatus for a printed electronic system according to an exemplary embodiment of the present invention including: a laser generating unit which oscillates a laser beam; a laser changing unit which changes an intensity or a wavelength of the laser beam oscillated from the laser generating unit; a laser control unit which controls the intensity or a magnitude of the wavelength of the laser beam which is changed by the laser changing unit; and a laser steering unit which changes a traveling direction of the laser beam output from the laser changing unit to be directed to a target, and the laser control unit controls the intensity or (Continued)

the magnitude of the wavelength of the laser beam in accordance with a state of a printing pattern formed on the target.

14 Claims, 7 Drawing Sheets

(51) Int. Cl.
  *H01S 3/13* (2006.01)
  *B22F 7/06* (2006.01)

(56) References Cited

FOREIGN PATENT DOCUMENTS

| | | | | |
|---|---|---|---|---|
| JP | 2012096286 A | * | 5/2012 | ............. B23K 26/06 |
| JP | 2013-127600 A | | 6/2013 | |
| KR | 10-2008-0015557 A | | 2/2008 | |
| KR | 10-2009-0016077 A | | 2/2009 | |
| KR | 10-2012-0036287 A | | 4/2012 | |
| KR | 10-1365821 B1 | | 2/2014 | |
| KR | 10-2014-0099404 A | | 8/2014 | |
| WO | WO-2011028246 A1 | * | 3/2011 | ......... G03F 7/70525 |

* cited by examiner

LASER APPARATUS FOR PRINTED ELECTRONICS SYSTEM AND OPERATING METHOD THEREOF

TECHNICAL FIELD

The present invention relates to a laser apparatus for a printed electronic system and an operating method thereof, and more particularly, to a laser apparatus for a printed electronic system which connects, repairs, and sinters a pattern or line printed on a display using a printed electronic system and an operating method thereof.

BACKGROUND ART

Efforts to increase a size of display devices have emerged as an important technical goal to determine a future viability of display companies around the world. From the viewpoint of increasing productivity and ensuring price competitiveness in a technology of implementing a large-area display, it is a very difficult technical problem to completely implement a pattern shape of various materials on a large-area substrate which is larger than 3 m. In this situation, a technique which efficiently repairs the defect as much as possible may be a core technique to implement the large-area display devices in the future.

In the meantime, in spite of the increase of the size of the next-generation display device, a highly integrated ultra-fine circuit wiring line with a wiring line of 6 μm or less and a wiring interval of 60 μm or less is required to form a display panel circuit (TFT) and an OLED display panel circuit (OTFT). However, a re-routing bridge repair wiring line forming method by a Laser CVD repair technique of the related art for improving defects of products with a highly integrated ultra-fine pattern has reached a technical limit so that there is an urgent need to develop a repair technique by a new repairing method.

Further, in order to implement a display device with a narrow bezel, in addition to an internal circuit wiring line in an LCD and an OLED display panel, efforts are increasing to implement an internal line width and a wiring line interval in the bezel to be 10 μm or less. Further, the demands on the development of the repair technology of the highly integrated ultra-fine bezel wiring line are also increasing.

In order to increase the areas of the next-generation display devices, it is proposed to form a display panel circuit using a printed electronic system. However, according to the printed electronic system of the related art, in order to repair a highly integrated ultra-fine circuit wiring line, a high temperature vacuum chamber, a high temperature heater chamber, and laser equipment need to be separately equipped so that it is difficult to repair a highly integrated ultra-fine circuit which is an internal circuit of the LCD and the OLED display panel with increased size in one system.

Accordingly, a necessity for a laser apparatus which is applicable to a printed electronic system is increasing.

As a related art document, there is Korean Unexamined Patent Application Publication No. 10-2008-0015557 (entitled Repair device of a flat panel display substrate circuit, published on Feb. 20, 2008).

DISCLOSURE

Technical Problem

The present invention is proposed to solve the above-described problems and provides a laser apparatus for a printed electronic system which is capable of being loaded or mounted in a printed electronic system and an operating method thereof.

Another object of the present invention is to provide a laser apparatus for a printed electronic system which repairs or sinters a printing pattern formed by a printed electronic system and an operating method thereof.

Another object of the present invention is to provide a laser apparatus for a printed electronic system which forms a conductive repair wiring line by sintering conductive ink using laser sintering and an operating method thereof.

Technical Solution

In order to achieve the objects as described above, according to an aspect of the present invention, there is provided a laser apparatus for a printed electronic system including a laser generating unit which oscillates a laser beam; a laser changing unit which changes an intensity or a wavelength of the laser beam oscillated from the laser generating unit; a laser control unit which controls the intensity or a magnitude of the wavelength of the laser beam which is changed by the laser changing unit; and a laser steering unit which changes a traveling direction of the laser beam output from the laser changing unit to be directed to a target, and the laser control unit controls the intensity or the magnitude of the wavelength of the laser beam in accordance with a state of a printing pattern formed on the target.

The laser changing unit may expand the laser beam oscillated by the laser generating unit or optimize the intensity or the wavelength of the laser beam.

The laser changing unit may include at least one or two collimation lenses and a mask disposed in front of the collimation lenses.

The laser steering unit may include a mirror or a Galvano scanner which changes the traveling direction of the laser beam output from the laser changing unit.

The laser steering unit may include a mirror driver which changes an angle or a position of the mirror or the Galvano scanner.

An operating state of the mirror driver may be controlled by the laser control unit.

The laser control unit may adjust a distance between the collimation lenses of the laser changing unit or adjust a distance between the mask and the collimation lenses to repair the printing pattern formed on the target or sinter a printing ink.

The laser apparatus may further include a vision sensor part which senses whether the printing pattern formed on the target is defective, whether the pattern is disconnected, or a size of the pattern.

The laser control unit may adjust a distance between the laser steering unit and the target, a distance between the collimation lenses of the laser changing unit or a distance between the mask and the collimation lens in accordance with a result sensed by the vision sensor part.

Further, according to another aspect of the present invention, there is provided an operating method of a laser apparatus for a printed electronic system which includes: a laser generating unit which oscillates a laser beam; a laser changing unit which changes an intensity or a wavelength of the laser beam oscillated from the laser generating unit; a laser control unit which controls the intensity or a magnitude of the wavelength of the laser beam which is changed by the laser changing unit; a laser steering unit which changes a traveling direction of the laser beam output from the laser changing unit to be directed to a target, and a vision sensor part which acquires an image of a printing pattern including whether the printing pattern is defective, whether the pattern is disconnected, or a size of the pattern, the method including acquiring an image of the printing pattern formed on the target, by the vision sensor part; determining whether to repair or sinter the printing pattern by analyzing an image acquired by the vision sensor part, by the laser control unit; transmitting whether to repair or sinter the printing pattern to the laser changing unit, by the laser control unit; adjusting an intensity, a magnitude of a wavelength, or a pulse width of a laser beam depending on whether to repair or sinter the printing pattern, by the laser changing unit, changing a traveling direction of the laser beam by receiving whether to repair or sinter the printing pattern from the laser control unit, by the laser steering unit; and adjusting a distance between the laser steering unit and the target by receiving an image from the vision sensor part, by the laser control unit.

In the acquiring of an image of the printing pattern formed on the target, by the vision sensor part; the vision sensor part may acquire an image indicating a repairing or sintering state of the printing pattern to transmit the image to the laser control unit.

In the adjusting of an intensity, a magnitude of a wavelength, or a pulse width of a laser beam depending on whether to repair or sinter the printing pattern, by the laser changing unit, the laser changing unit may include at least one or two collimation lenses and a mask disposed in front of the collimation lenses and the laser control unit may adjust a distance between the collimation lenses of the laser changing unit or a distance between the mask and the collimation lens in accordance with a result sensed by the vision sensor part.

In the changing of a traveling direction of the laser beam by receiving whether to repair or sinter the printing pattern from the laser control unit, by the laser steering unit, the laser steering unit may include a mirror or a Galvano scanner which changes a traveling direction of the laser beam output from the laser changing unit and a mirror driver which changes an angle or a position of the mirror or the Galvano scanner, and the laser control unit may change the traveling direction of the laser beam by controlling an operating state of the mirror driver.

The laser control unit may control a reflection angle of the mirror or the Galvano scanner.

In the determining of whether to repair or sinter the printing pattern by analyzing an image acquired by the vision sensor part, by the laser control unit; the laser control unit may adjust the distance or the height between the laser steering unit and the target in accordance with a result sensed by the vision sensor part.

Advantageous Effects

As described above, according to the laser apparatus for a printed electronic system according to an exemplary embodiment of the present invention and an operating method thereof, a repair wiring line may be directly formed on a defective part to repair a defective wiring line due to a highly integrated ultra-fine patterning of a display apparatus, by irradiating laser.

According to the laser apparatus for a printed electronic system according to an exemplary embodiment of the present invention and an operating method thereof, a repairing status of the wiring line is accurately monitored in real time so that the repairing accuracy is enhanced and inconvenience to repair the disconnected line again is reduced.

According to the laser apparatus for a printed electronic system according to an exemplary embodiment of the present invention and an operating method thereof, the repairing ink is sintered using laser sintering so that conductible repairing wiring line may be quickly formed.

According to the laser apparatus for a printed electronic system according to an exemplary embodiment of the present invention and an operating method thereof, it is possible to be used while being loaded or mounted in a printed electronic system so that a time to repair the printing pattern or sinter the ink may be shortened and convenience of a maintenance job may be enhanced.

MODE FOR INVENTION

Figure 1:
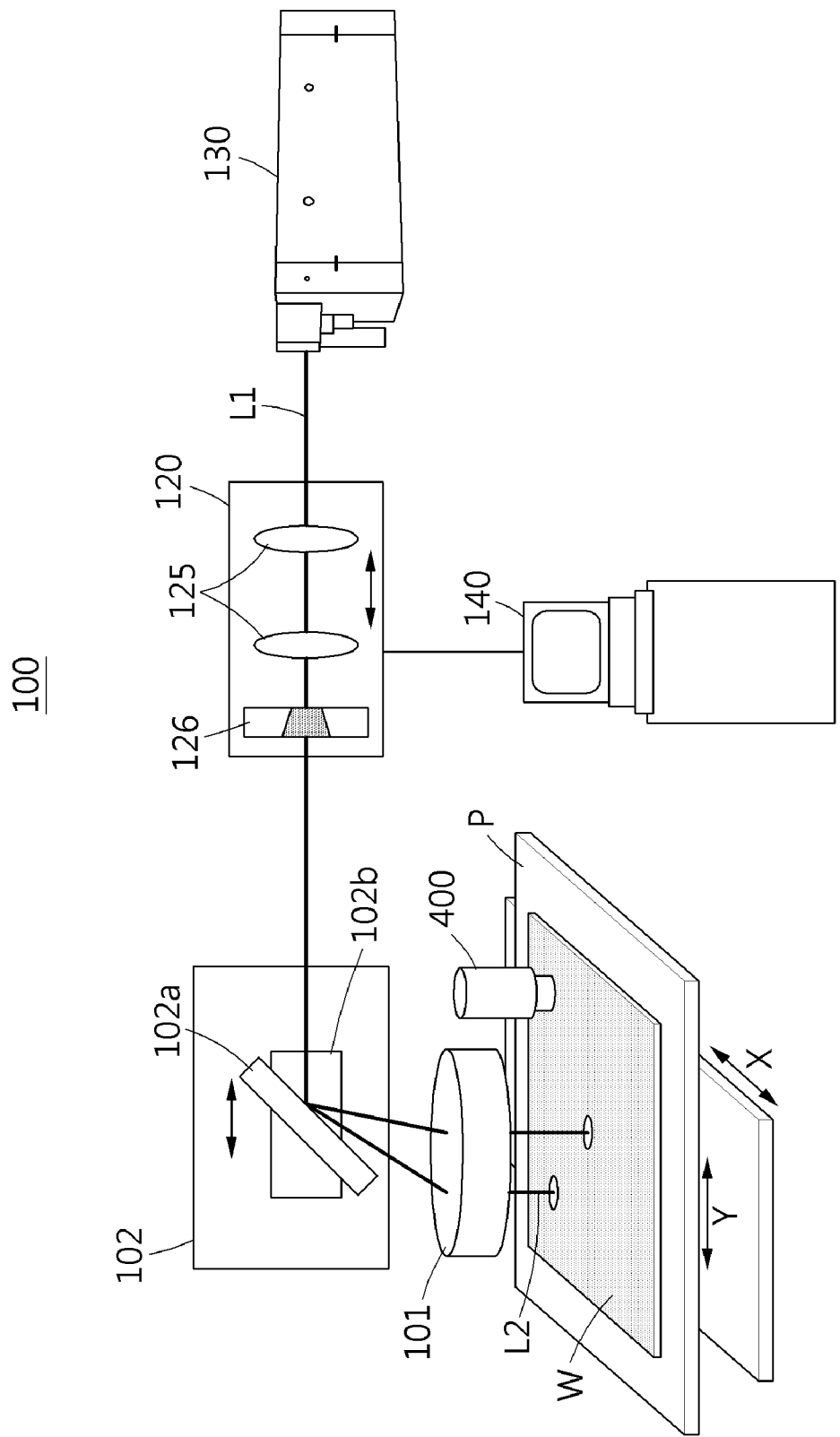
FIG. 1 is a schematic view illustrating a configuration of a laser apparatus for a printed electronic system according to an exemplary embodiment of the present invention.

Hereinafter, exemplary embodiments of the present invention will be described in detail with reference to the accompanying drawings. However, the present invention is not restricted or limited by the exemplary embodiments. In each of the drawings, like reference numerals denote like elements.

Figure 2:
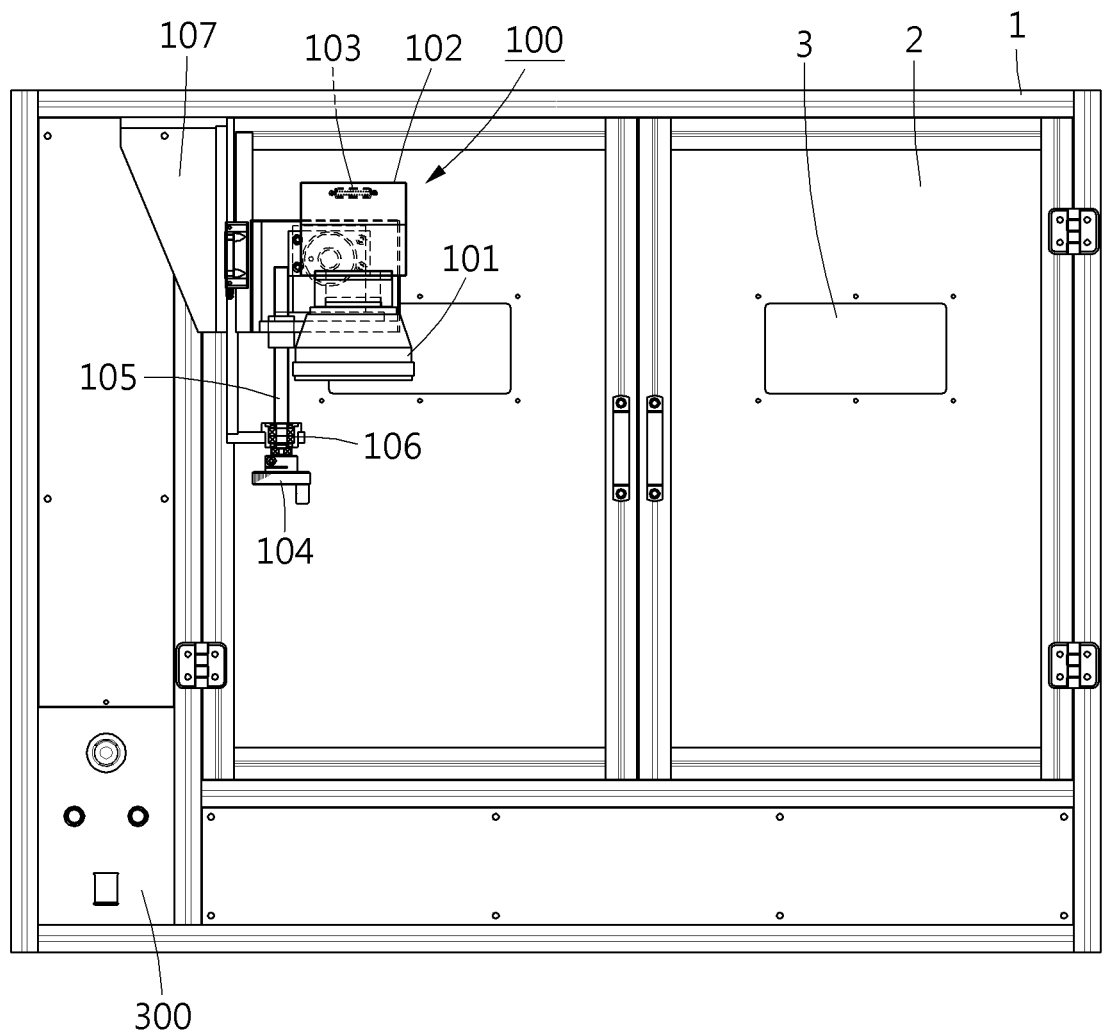
FIG. 2 is a front view illustrating a printed electronic system equipped with a laser apparatus according to an exemplary embodiment of the present invention.
Figure 3:
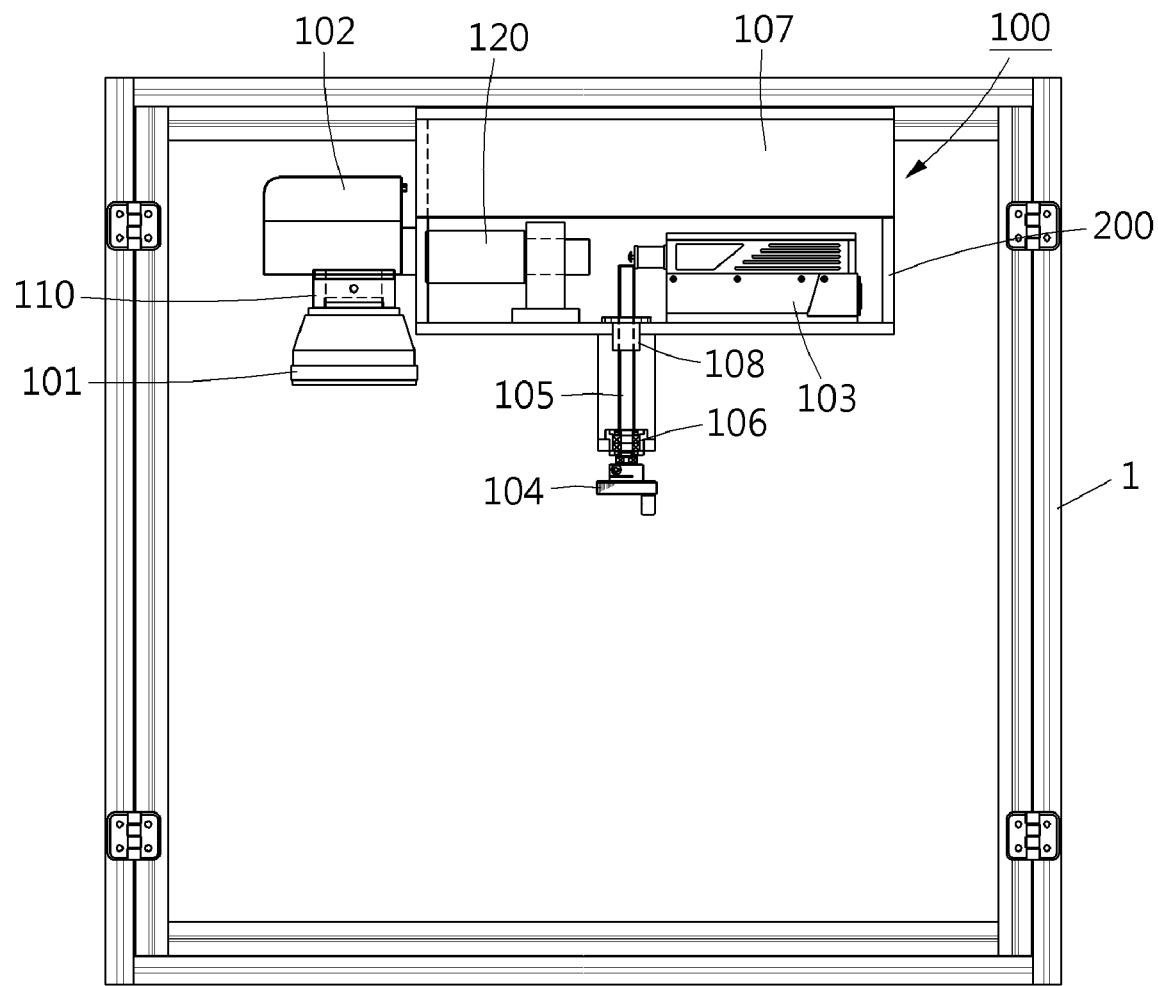
FIG. 3 is a side view illustrating a printed electronic system illustrated in FIG. 2.
Figure 4:
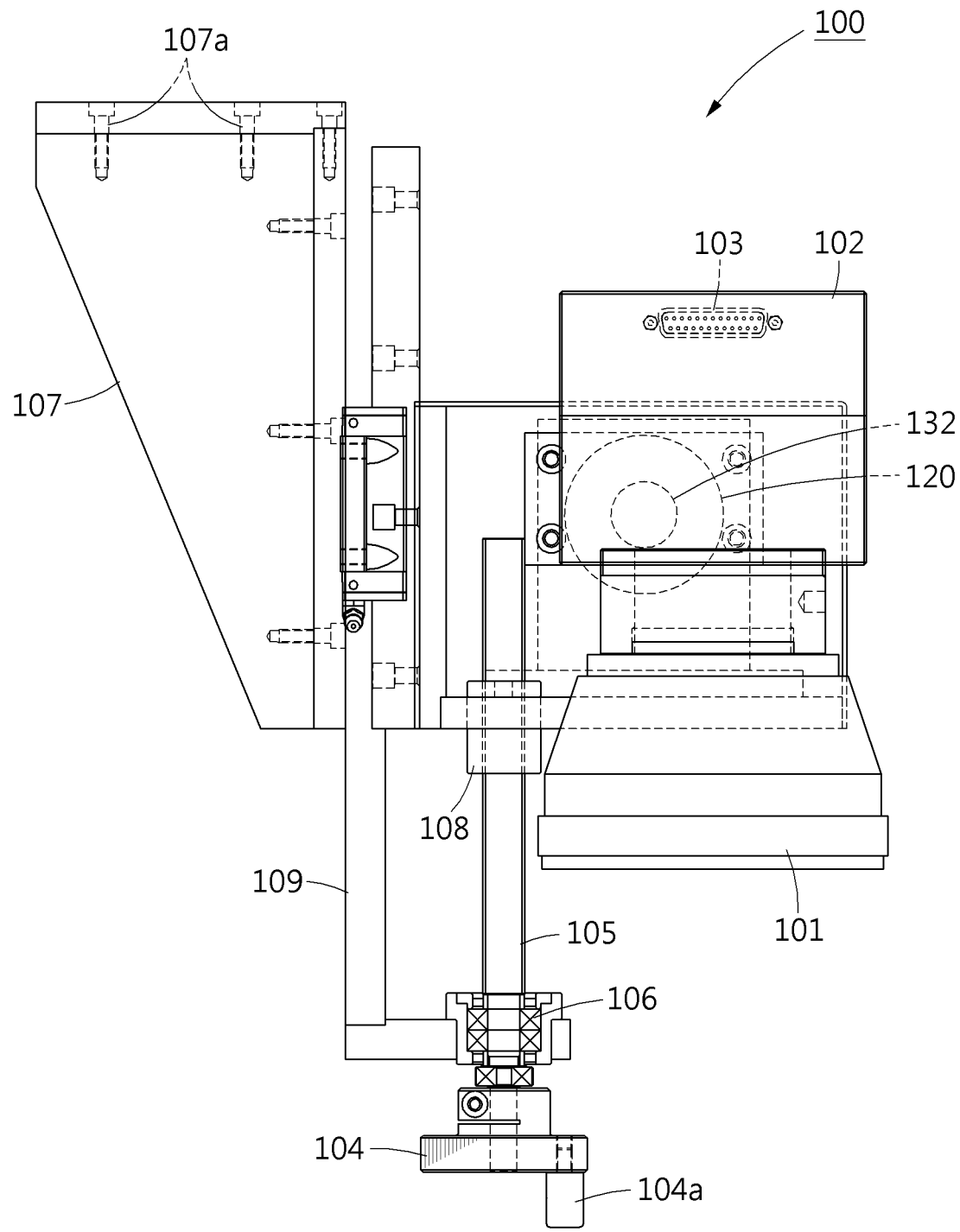
FIG. 4 is a front view of the laser apparatus according to an exemplary embodiment of the present invention.
Figure 5:
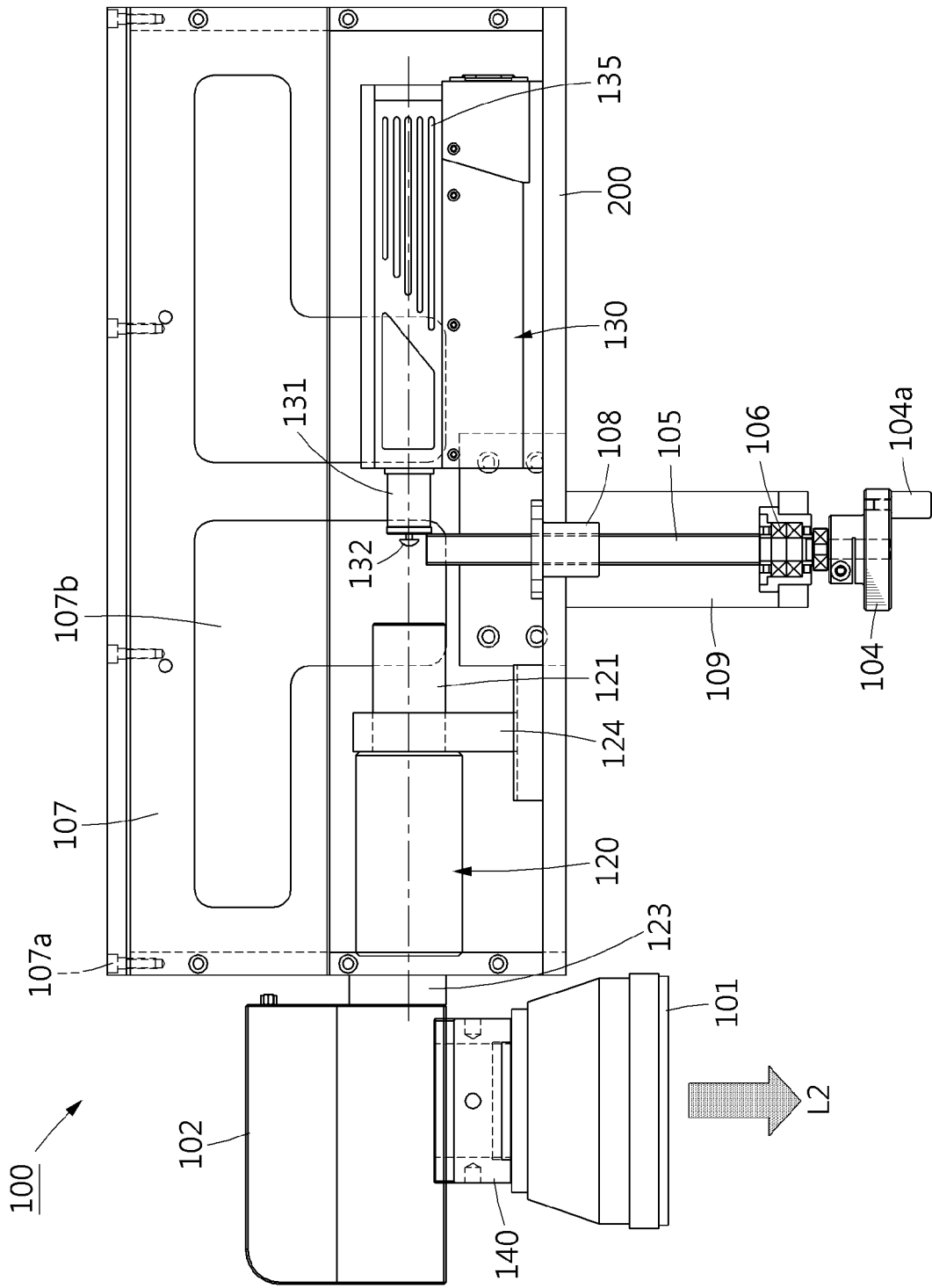
FIG. 5 is a side view of a laser apparatus of FIG. 4.
Figure 6:
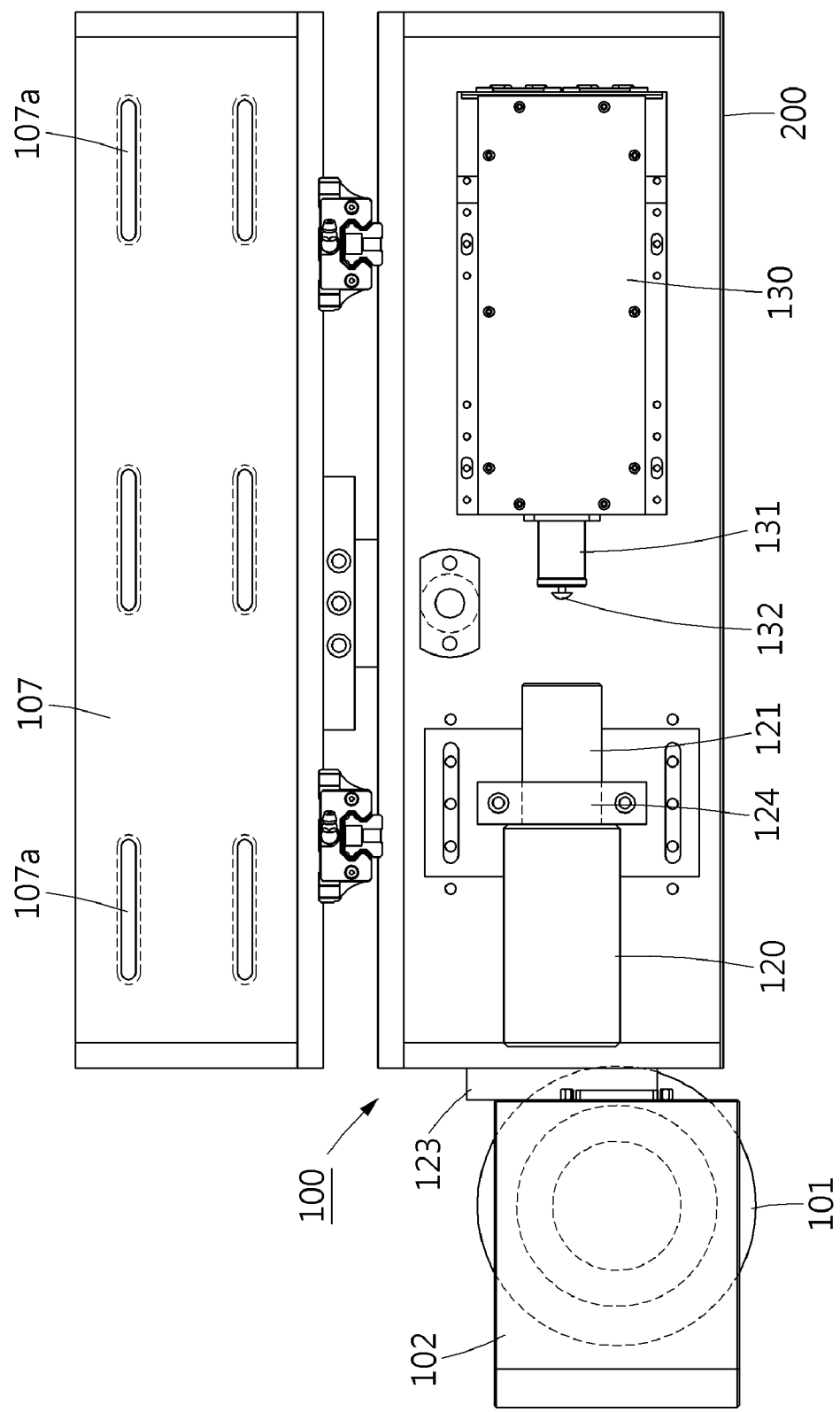
FIG. 6 is a plan view of a laser apparatus of FIG. 4.
Figure 7:
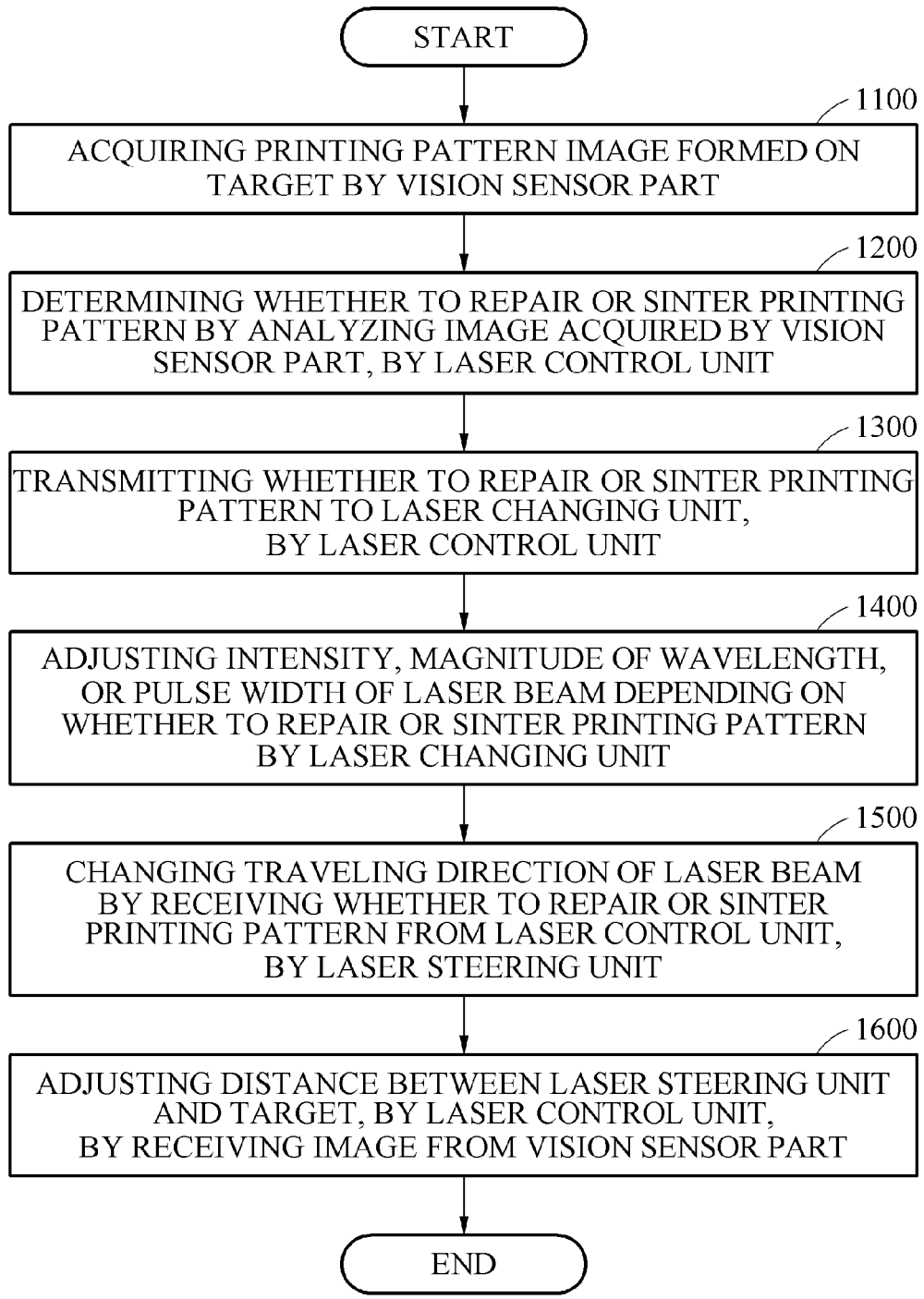
FIG. 7 is a flowchart illustrating an operating method of a laser apparatus for a printed electronic system according to an exemplary embodiment of the present invention.

FIG. 1 is a schematic view illustrating a configuration of a laser apparatus for a printed electronic system according to an exemplary embodiment of the present invention, FIG. 2 is a front view illustrating a printed electronic system equipped with a laser apparatus according to an exemplary embodiment of the present invention, FIG. 3 is a side view illustrating a printed electronic system illustrated in FIG. 2, FIG. 4 is a front view of the laser apparatus according to an exemplary embodiment of the present invention, FIG. 5 is a side view of a laser apparatus of FIG. 4, FIG. 6 is a plan view of a laser apparatus of FIG. 4, and FIG. 7 is a flowchart illustrating an operating method of a laser apparatus for a printed electronic system according to an exemplary embodiment of the present invention.

Referring to FIGS. 1 to 6, a laser apparatus 100 for a printed electronic system according to an exemplary embodiment of the present invention includes a laser generating unit 130 which oscillates a laser beam, a laser changing unit 120 which changes an intensity or a wavelength of a laser beam oscillated from the laser generating unit 130, a laser control unit 140 which controls an intensity or a magnitude of the wavelength of the laser beam changed by the laser changing unit 120, and a laser steering unit 102 which changes a traveling direction of the laser beam output from the laser changing unit 120 to be directed to a target W.

Here, the laser control unit 140 may control an intensity or a magnitude of the wavelength of the laser beam in accordance with a state of a printing pattern formed on the target W.

The laser generating unit 130 is a part which oscillates the laser L1 to form various types of laser. For example, various types of laser beams such as ruby laser, He—Ne laser, semiconductor laser, and dye laser may be oscillated. However, the laser apparatus 100 according to the exemplary embodiment of the present invention is applied to a printed electronic system so that the laser generating unit 130 may desirably generate a laser beam suitable to repair a pattern printed by a printed electronic system or sinter a printing ink.

The laser beam oscillated from the laser generating unit 130 may be input to the laser changing unit 120 provided on a traveling path of the laser beam.

The laser changing unit 120 may expand the laser beam oscillated from the laser generating unit 130 or optimize the intensity or the wavelength of the laser beam and the laser generating unit 130 may continuously oscillate the laser or oscillate a pulsed laser. To this end, the laser changing unit 120 may include at least one or two collimation lenses 125 and a mask 126 disposed in front of the collimation lens 125.

Further, the laser changing unit 120 may include a focusing lens, instead of the mask 126. That is, the laser changing unit 120 may optimize the intensity or the magnitude of the wavelength of the laser beam by means of the at least one or two collimation lenses 125 and a focusing lens 126 disposed in front of the collimation lens 125.

The laser changing unit 120 is a part which adjusts a state of the oscillated laser beam in accordance with a pattern printed on the target W by the printed electronic system, for example, a size, a shape of the highly integrated ultra-fine circuit wiring line, whether the wiring line is defective or disconnected and is considered as a core component of the laser apparatus 100 according to the exemplary embodiment of the present invention.

Referring to FIG. 1, the laser changing unit 120 may include at least two collimation lenses 125 disposed to be spaced apart from each other with a predetermined interval along a traveling direction of the laser beam and a mask 126 disposed in front of the collimation lens 125 along the traveling direction of the laser beam.

Here, the laser changing unit 120 may adjust or change an intensity, a magnitude of the wavelength, or a pulse width of the laser beam by adjusting a distance between the collimation lenses 125 which are disposed to be spaced apart from each other or a distance between the mask 126 and the collimation lens 125.

The laser changing unit 120 may further include a distance changing unit (not illustrated) to adjust the distance between collimation lenses 125 or a distance between the mask 126 and the collimation lens 125.

In the meantime, instead of the collimation lens 125, a variable focus lens (not illustrated) may be used. That is, a variable focus lens with a variable focal distance may be used rather than the collimation lenses 125 with a focal distance fixed at a constant value. The focal distance of the lens is changed using the variable focal lens so that an intensity, a magnitude of the wavelength, or a pulse width of the laser beam emitted from the laser changing unit 120 may be adjusted. In this case, the laser changing unit 120 may further include a focus changing driver (not illustrated) to vary the focal distance of the variable focus lens. Here, the focus changing driver may be provided by a driving motor (not illustrated).

The driving motor or the focus changing driver may operate or may not operate by the laser control unit 140.

The laser control unit 140 may adjust a distance between the collimation lenses 125 of the laser changing unit 120 or control a distance between the mask 126 and the collimation lens 125 to repair or sinter the printing pattern formed on the target W. Further, the laser control unit 140 selectively operates the driving motor or the focus changing driver to repair the printing pattern formed on the target W or sinter the printing ink.

The mask 126 of the laser changing unit 120 may be desirably configured by an image transcription mask. The collimation lens 125 may adjust a pulse width of the laser. The laser control unit 140 drives the collimation lens 125 to change a diameter of the laser beam projected onto the mask 126 and the laser beam cut out by the mask 126 may become a laser beam having a high circularity.

In the meantime, the laser steering unit 102 may include a mirror 102a or a Galvano scanner (not illustrated) which changes a traveling direction of the laser beam output from the laser changing unit 120. The mirror 102a or the Galvano scanner of the laser steering unit 102 may change the traveling direction of the laser beam output from the laser changing unit 120 to be directed to the target W.

The laser steering unit 102 may include a mirror driver 102b to change an angle or a position of the mirror 102a or the Galvano scanner.

Further, the laser steering unit 102 may further include a lens 101 which finally emits the laser beam with a changed traveling direction to the target W. An fθ lens may be desirably used as the lens 101. The laser beam L2 finally emitted from the lens 101 may be directed to the target W.

Here, the mirror driver 102b may receive a control signal from the laser control unit 140 to adjust a reflection angle of the mirror 102a or the Galvano scanner.

The laser steering unit 102 may determine a position of the laser beam emitted from the laser changing unit 120 at a high speed in a scan area on the target W by the mirror 102a or the Galvano scanner which rotates at a high speed and the lens 101.

In the meantime, the laser apparatus 100 according to the exemplary embodiment of the present invention may further include a vision sensor part 400 which senses whether a printing pattern formed on the target W is defective, whether the pattern is disconnected, or a size of the pattern.

The vision sensor part 400 may be formed by a vision camera and acquire an image indicating whether the printing pattern formed on the target W is defective or an image indicating a state of the laser beam irradiated onto the target W.

The vision sensor part 400 may transmit data, such as the acquired image, to the laser control unit 140 and the laser control unit 140 may control a distance between the laser steering unit 102 and the target W, a distance between the collimation lenses 125 of the laser changing unit 120, or a distance between the mask 126 and the collimation lens 125, in accordance with a result sensed by the vision sensor part 400.

Referring to FIG. 1, the target W onto which the laser beam L2 is irradiated is placed on a plate P and the plate P may move in an X axis or Y axis direction to adjust the position of the laser beam L2.

Hereinafter, an example in which the laser apparatus 100 according to the exemplary embodiment of the present invention is installed in a printed electronic system will be described with reference to FIGS. 2 to 6.

Referring to FIGS. 2 and 3, the laser apparatus 100 according to the exemplary embodiment of the present invention may be provided in a case 1 of a printed electronic system.

The case 1 may be provided with a door 2 which can be open and closed and the door 2 may be provided with an observation window 3. The door 2 may be formed of an opaque material so that the inside of the case 1 is not visible and the observation window 3 may be formed of a transparent material so that the inside of the case 1 can be seen. An operator may observe a working state of the laser apparatus 100 provided in the case 1 through the observation window 3 with naked eyes. In this case, the observation window 3 may be desirably formed of a material which can protect the eyes of the operator.

In the meantime, a power supply 300 may be provided at a left lower end of the case 1 to supply the power to the printed electronic system (not illustrated) or the laser apparatus 100.

The laser apparatus 100 according to the exemplary embodiment of the present invention is mounted in the case 1 using a mounting frame 107. That is, the laser apparatus 100 is coupled to the mounting frame 107 and the mounting frame 107 may be coupled to a main frame (not illustrated) of the case 1.

In the meantime, the laser apparatus 100 may further include a vertical guide rod 105 which adjusts a distance between the target W and the laser steering unit 102, that is, a height of the laser steering unit 102, a bearing 106 which rotatably supports the vertical guide rod 105, and a height adjusting handle 104. In this case, the laser apparatus 100 may be desirably provided to be vertically movable in the mounting frame 107.

Referring to FIG. 3, an upper end and a side end of the mounting frame 107 may be coupled to the case 1. The laser changing unit 120 and the laser generating unit 130 of the laser apparatus 100 are provided in a protection case 200 and the laser steering unit 102 may be provided outside of the protection case 200.

In the protection case 200, a guide bush 108 inserted on an outer circumferential surface of the vertical guide rod 105 may be provided. Screw threads may be formed on the outer circumferential surface of the vertical guide rod 105 and the inner circumferential surface of the guide bush 108 to be engaged with each other. When the operator turns a height adjusting handle 104, the vertical guide rod 105 rotates and the guide bush 108 with screw threads formed on the inner circumferential surface which are engaged with the screw threads formed on the outer circumferential surface of the vertical guide rod 105 vertically moves on the vertical guide rod 105 and thus, the height of the laser apparatus 100 may be adjusted.

In the meantime, the laser steering unit 102 may further include a vertical body tube 110 connected to the lens 101. Further, a grip unit 104a may be provided to protrude from the height adjusting handle 104.

In FIGS. 4 to 6, a more detailed shape of the laser apparatus 100 according to the exemplary embodiment of the present invention to be mounted in a printed electronic system is illustrated.

Referring to FIGS. 4 to 6, a fastening hole 170a into which a fastening means such as a screw is inserted may be formed in the mounting frame 107 to be coupled to the case 1. Further, a fixed rod 109 which supports the bearing 106 may be connected to a lower end of the mounting frame 107 and a lower end of the fixed rod 109 may be desirably bent in a horizontal direction to be coupled to the bearing 106.

A cable connection port 103 may be provided at one side of the laser steering unit 102 to input a control signal or an electrical signal.

A horizontal body tube 123 may be provided between the laser steering unit 102 and the laser changing unit 120. That is, the laser steering unit 102 and the laser changing unit 120 may be coupled to each other by means of the horizontal body tube 123.

The laser changing unit 120 may include a support unit 124 which fixes the laser changing unit 120 in the protection case 200. A lower end of the support unit 124 is fixed to a bottom of the protection case 200 and an extending housing 121 of the laser changing unit 120 may be fixed to an upper end.

Even though the laser steering unit 102 and the laser changing unit 120 are coupled by means of the horizontal body tube 123, the laser changing unit 120 and the laser generating unit 130 may be provided in the protection case 200 to be spaced apart from each other without being coupled to each other.

In the laser generating unit 130, a plurality of heat radiation slits 135 for cooling may be formed. A laser rod 131 is formed at a front end of the laser generating unit 130 and the laser oscillating unit 132 may be formed at a front end of the laser rod 131.

The laser beam L1 output from the laser oscillating unit 132 may be transmitted to the laser changing unit 120 through the extending housing 121.

In the meantime, a height adjusting motor (not illustrated) may be provided instead of the height adjusting handle 104. An operation of the height adjusting motor may be controlled by the laser control unit 140. For example, the laser control unit 140 calculates a distance between the lens 101 and the target W by analyzing an image of the target W acquired by the vision sensor part 400 and transmits a driving signal in accordance with the calculated result to the height adjusting motor to adjust the distance between the target W and the lens 101 or the height of the laser apparatus 100.

The laser apparatus for a printed electronic system according to the exemplary embodiment of the present invention described above may emit laser onto a pattern printed on a target, such as a large-area display, by a printed electronic system to repair the pattern or sinter the printing ink and change the intensity, the magnitude of the wavelength, or the pulse width of the laser in accordance with a working type, whether the pattern is defective, or a defect state so that various operations may be performed by one printed electronic system.

Hereinafter, an operating method of a laser apparatus 100 for a printed electronic system according to the above-described exemplary embodiment of the present invention will be described.

FIG. 7 is a flowchart illustrating an operating method of a laser apparatus for a printed electronic system according to an exemplary embodiment of the present invention.

Referring to FIGS. 1 to 7, in a laser apparatus 100 for a printed electronic system according to an exemplary embodiment of the present invention including a laser generating unit 130 which oscillates a laser beam L1, a laser changing unit 120 which changes an intensity or a wavelength of a laser beam oscillated from the laser generating unit 130, a laser control unit 140 which controls an intensity or a magnitude of the wavelength of the laser beam changed by the laser changing unit 120, a laser steering unit 102 which changes a traveling direction of the laser beam output from the laser changing unit 120 to be directed to a target, and a vision sensor part 400 which acquires an image of the printing pattern including whether the printing pattern is defective, whether the pattern is disconnected, or a pattern size, an operating method of the laser apparatus 100 for a printed electronic system according to an exemplary embodiment of the present invention includes: a step 1100 of acquiring an image of a printing pattern formed on the target by the vision sensor part 400, a step 1200 of determining whether to repair or sinter the printing pattern by analyzing the image acquired by the vision sensor part 400, by the laser control unit 140, a step 1300 of transmitting whether to repair or sinter the printing pattern to the laser changing unit 120, by the laser control unit 140, a step 1400 of adjusting an intensity, a magnitude of a wavelength, or a pulse width of a laser beam depending on whether to repair or sinter the printing pattern, by the laser changing unit 120, a step 1500 of changing a traveling direction of the laser beam by receiving whether to repair or sinter the printing pattern from the laser control unit 140, by the laser steering unit 102, and a step 1600 of adjusting a distance between the laser steering unit 102 and the target W, by the laser control unit 140, by receiving the image from the vision sensor part 400.

In the step 1100 of acquiring an image of a printing pattern formed on the target by the vision sensor part 400, the vision sensor part 400 may acquire an image indicating a repair or sintering state of the printing pattern to transmit the image to the laser control unit 140.

The laser control unit 140 may receive the image (including a video) of the printing pattern acquired by the vision sensor part 400 and analyze the image to determine whether it is required to repair or sinter the printing pattern.

Further, the user may directly input a command for a repair or sintering operation of the printing pattern to the laser control unit 140. When the user inputs the command, the laser control unit 140 may desirably perform the command of the user preferentially to an image analysis result acquired by the vision sensor part 400.

The laser control unit 140 may control an intensity, a width, or a wavelength of the laser required to repair when the printing pattern printed on the target W is defective such as disconnection. Further, the laser control unit 140 may control the laser to have an intensity, a width, or a wavelength suitable for sintering the printing pattern printed on the target W.

The laser control unit 140 may transmit information, such as an intensity, a width, or a wavelength of the laser, or a command in accordance with the repair or sintering operation, to the laser changing unit 120.

In the step 1400 of adjusting an intensity, a magnitude of a wavelength, or a pulse width of a laser beam depending on whether to repair or sinter the printing pattern, by the laser changing unit 120, the laser changing unit 120 includes at least one or two collimation lenses 125 and a mask 126 disposed in front of the collimation lenses 125 and the laser control unit 140 may control a distance between the collimation lenses 125 of the laser changing unit 120 or a distance between the mask 126 and the collimation lenses 125 in accordance with a result sensed by the vision sensor part 400.

That is, the laser changing unit 120 may change the state of the laser suitable for information or the command received by the laser control unit 140, such as a repair position, a size, or a sintering degree of the printing pattern. The operation of the laser changing unit 120 has been described in a related part of the laser apparatus 100 so that a redundant description will be omitted.

In the step 1500 of changing a traveling direction of the laser beam by receiving whether to repair or sinter the printing pattern from the laser control unit 140, by the laser steering unit 102, the laser steering unit 102 includes a mirror 102a or the Galvano scanner which changes a traveling direction of the laser beam output from the laser changing unit 120 and a mirror driver 102b which changes an angle or a position of the mirror 102a or the Galvano scanner and the laser control unit 140 may change the traveling direction of the laser beam by controlling an operating state of the mirror driver 102b.

That is, the laser control unit 140 transmits a control signal to the mirror driver 102b and the mirror driver 102b which receives the control signal may control a reflection angle of the mirror 102a or the Galvano scanner.

In the meantime, in the step 1200 of determining whether to repair or sinter the printing pattern by analyzing the image acquired by the vision sensor part 400, by the laser control unit 140, the laser control unit 140 may adjust the distance or a height between the laser steering unit 102 and the target W in accordance with a result sensed by the vision sensor part 400.

As described above, the laser steering unit 102 may be provided to descent or ascent toward the target W to adjust the distance or the height from the target W.

The laser apparatus 100 according to the exemplary embodiment of the present invention may further include a vertical guide rod 105 which adjusts a distance between the target W and the laser steering unit 102, that is, a height of the laser steering unit 102, a bearing 106 which rotatably supports the vertical guide rod 105, and a height adjusting handle 104. In this case, instead of the height adjusting handle 104, a height adjusting motor (not illustrated) may be provided. In this case, the height adjusting motor may receive the control signal from the laser control unit 140. As configured as described above, the laser control unit 140 may transmit information required to repair or sinter the printing pattern to the height adjusting motor as a control signal and the height adjusting motor may automatically adjust the height of the laser steering unit 102 in accordance with the received control signal.

In the meantime, the laser control unit 140 drives the collimation lens 125 to change a diameter of the laser beam which is projected onto the mask 126. That is, the laser control unit 140 drives the collimation lens 125 to change a diameter of the laser beam projected onto the mask 126 and the laser beam cut out by the mask 126 may become a laser beam having a high circularity.

The laser changing unit 120 may adjust a state of the laser beam oscillated from the laser generating unit 130 depending on a size, a shape, a defect, or a disconnected state of the printing pattern which is printed on the target W.

The specified matters and limited exemplary embodiments and drawings such as specific elements in the exemplary embodiment of the present invention have been disclosed for broader understanding of the present invention, but the present invention is not limited the exemplary embodiments, and various modifications, additions and substitutions are possible from the disclosure by those skilled in the art. The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

INDUSTRIAL APPLICABILITY

The present invention may be used in a printed electronic field which manufactures displays.

The invention claimed is:

1. A laser apparatus for a printed electronic system, comprising:
    a laser generating unit configured to oscillate a laser beam;
    a laser changing unit configured to change an intensity or a wavelength of the laser beam oscillated from the laser generating unit;
    a laser control unit configured to control the intensity or a magnitude of the wavelength of the laser beam which is changed by the laser changing unit; and
    a laser steering unit configured to change a traveling direction of the laser beam output from the laser changing unit to be directed to a target,
    wherein the laser control unit configured to control the intensity or the magnitude of the wavelength of the laser beam in accordance with a state of a printing pattern formed on the target, and to adjust a distance between collimation lenses of the laser changing unit or adjust a distance between a mask and the collimation lenses to repair the printing pattern formed on the target or sinter a printing ink.

2. The laser apparatus according to claim 1, wherein the laser changing unit is configured to expand the laser beam oscillated by the laser generating unit or to optimize the intensity or the wavelength of the laser beam.

3. The laser apparatus according to claim 2, wherein the mask is disposed in front of the collimation lenses.

4. The laser apparatus according to claim 3, wherein the laser steering unit includes a mirror or a Galvano scanner which is configured to change the traveling direction of the laser beam output from the laser changing unit.

5. The laser apparatus according to claim 4, wherein the laser steering unit includes a mirror driver which is configured to change an angle or a position of the mirror or the Galvano scanner.

6. The laser apparatus according to claim 5, wherein an operating state of the mirror driver is controlled by the laser control unit.

7. The laser apparatus according to claim 1, further comprising:
    a vision sensor configured to sense to determine whether the printing pattern formed on the target is defective, whether the printing pattern is disconnected, or a size of the printing pattern.

8. The laser apparatus according to claim 7, wherein the laser control unit is configured to adjust a distance between the laser steering unit and the target or to adjust the distance between the collimation lenses of the laser changing unit or the distance between the mask and the collimation lenses in accordance with a result sensed by the vision sensor.

9. An operating method of a laser apparatus for a printed electronic system which includes: a laser generating unit configured to oscillate a laser beam; a laser changing unit configured to change an intensity or a wavelength of the laser beam oscillated from the laser generating unit; a laser control unit configured to control the intensity or a magnitude of the wavelength of the laser beam which is changed by the laser changing unit; a laser steering unit configured to change a traveling direction of the laser beam output from the laser changing unit to be directed to a target; and a vision sensor configured to acquire an image of a printing pattern to determine whether the printing pattern is defective, whether the pattern is disconnected, or a size of the pattern, the operating method comprising:
    acquiring the image of the printing pattern formed on the target, by the vision sensor;
    determining whether to repair or sinter the printing pattern by analyzing the image acquired by the vision sensor, by the laser control unit;
    transmitting whether to repair or sinter the printing pattern to the laser changing unit, by the laser control unit;
    adjusting the intensity, the magnitude of the wavelength, or a pulse width of the laser beam depending on whether to repair or sinter the printing pattern, by the laser changing unit,
    changing the traveling direction of the laser beam by receiving information on whether to repair or sinter the printing pattern from the laser control unit, by the laser steering unit; and
    adjusting a distance between the laser steering unit and the target by receiving the image from the vision sensor, by the laser control unit.

10. The operating method according to claim 9, wherein in the acquiring of the image of the printing pattern formed on the target, by the vision sensor, the vision sensor acquires the image indicating a repairing or sintering state of the printing pattern to transmit the image to the laser control unit.

11. The operating method according to claim 10, wherein in the adjusting of the intensity, the magnitude of the wavelength, or the pulse width of the laser beam depending on whether to repair or sinter the printing pattern, by the laser changing unit, the laser changing unit includes at least one collimation lens and a mask disposed in front of the at least one collimation lens, and the laser control unit adjusts a distance between the collimation lenses of the laser changing unit or a distance or a height between the mask and the at least one collimation lens in accordance with a result sensed by the vision sensor.

12. The operating method according to claim 11, wherein in the changing of the traveling direction of the laser beam by receiving information on whether to repair or sinter the printing pattern from the laser control unit, by the laser steering unit, the laser steering unit includes a mirror or a Galvano scanner which is configured to change the traveling direction of the laser beam output from the laser changing unit and a mirror driver which is configured to change an angle or a position of the mirror or the Galvano scanner, and the laser control unit is configured to change the traveling direction of the laser beam by controlling an operating state of the mirror driver.

13. The operating method according to claim 12, wherein the laser control unit is configured to control a reflection angle of the mirror or the Galvano scanner.

14. The operating method according to claim 12, wherein in the determining of whether to repair or sinter the printing pattern by analyzing the image acquired by the vision sensor, by the laser control unit, the laser control unit adjusts the distance or the height between the laser steering unit and the target in accordance with the result sensed by the vision sensor.

* * * * *